(12) United States Patent
Lee et al.

(10) Patent No.: US 10,943,486 B2
(45) Date of Patent: Mar. 9, 2021

(54) TRAVELING SAFETY CONTROL SYSTEM USING AMBIENT NOISE AND CONTROL METHOD THEREOF

(71) Applicants: Hyundai Motor Company, Seoul (KR); Kia Motors Corporation, Seoul (KR)

(72) Inventors: Dong-Chul Lee, Anyang-Si (KR); In-Soo Jung, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/678,815

(22) Filed: Nov. 8, 2019

(65) Prior Publication Data

US 2020/0175877 A1     Jun. 4, 2020

(30) Foreign Application Priority Data

Nov. 29, 2018  (KR) .......................... 10-2018-0151063

(51) Int. Cl.

| | |
|---|---|
| *G10L 25/51* | (2013.01) |
| *G08G 1/16* | (2006.01) |
| *G08G 1/052* | (2006.01) |
| *H04R 1/40* | (2006.01) |
| *H04R 3/00* | (2006.01) |
| *G10L 25/18* | (2013.01) |
| *G06N 3/04* | (2006.01) |
| *G06N 3/08* | (2006.01) |

(52) U.S. Cl.
CPC ........... *G08G 1/166* (2013.01); *G06N 3/0445* (2013.01); *G06N 3/08* (2013.01); *G08G 1/052* (2013.01); *G10L 25/18* (2013.01); *G10L 25/51* (2013.01); *H04R 1/406* (2013.01); *H04R 3/005* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 9,469,247 | B2* | 10/2016 | Juneja ....................... | B60C 9/00 |
| 9,872,225 | B2* | 1/2018 | Guba ..................... | H04W 4/027 |
| 2009/0243888 | A1* | 10/2009 | Kawabata ............ | B62D 15/028 |
| | | | | 340/932.2 |
| 2012/0323532 | A1* | 12/2012 | Yoshioka ................ | B60R 16/00 |
| | | | | 702/189 |

(Continued)

FOREIGN PATENT DOCUMENTS

| | | |
|---|---|---|
| DE | 10 2017 221 701 A1 | 4/2019 |
| JP | 2014067092 A *  | 4/2014 |

(Continued)

*Primary Examiner* — Benyam Haile
*Assistant Examiner* — Muhammad Adnan
(74) *Attorney, Agent, or Firm* — Morgan, Lewis & Bockius LLP

(57) ABSTRACT

A traveling safety control system using ambient noise may include a microphone mounted in an operating vehicle and for receiving ambient noise; and a signal processing controller for comparing the ambient noise with vehicle noise characteristic data and determining traveling information related to a nearby vehicle through an artificial intelligence-based analysis.

18 Claims, 8 Drawing Sheets

(56) References Cited

U.S. PATENT DOCUMENTS

| | | | |
|---|---|---|---|
| 2016/0019458 A1* | 1/2016 | Kaufhold | G06N 3/0463 |
| | | | 342/25 F |
| 2017/0078948 A1* | 3/2017 | Guba | H04W 48/04 |
| 2018/0345978 A1* | 12/2018 | Fujii | B62D 15/0255 |
| 2019/0114849 A1* | 4/2019 | Lee | G06N 3/08 |
| 2019/0147255 A1* | 5/2019 | Homayounfar | G06N 3/0454 |
| | | | 701/23 |
| 2019/0189015 A1* | 6/2019 | Gesch | B60R 1/0612 |
| 2020/0034215 A1* | 1/2020 | Petrillo | G06F 9/4881 |
| 2020/0150651 A1* | 5/2020 | Tang | B60Q 5/005 |

FOREIGN PATENT DOCUMENTS

| | | |
|---|---|---|
| KR | 10-2013-0046779 A | 5/2013 |
| KR | 10-1565006 B1 | 11/2015 |
| KR | 10-2017-0055203 A | 5/2017 |
| KR | 10-2017-0133858 A | 12/2017 |

* cited by examiner

TRAVELING SAFETY CONTROL SYSTEM USING AMBIENT NOISE AND CONTROL METHOD THEREOF

CROSS-REFERENCE TO RELATED APPLICATION

The present application claims priority to Korean Patent Application No. 10-2018-0151063, filed on Nov. 29, 2018, the entire contents of which is incorporated herein for all purposes by this reference.

BACKGROUND OF THE PRESENT INVENTION

Field of the Invention

The present invention relates to a traveling safety control system using ambient noise and a control method thereof, and more particularly, to a traveling safety control system using ambient noise and a control method thereof, which assists safe traveling by analyzing ambient noise of an operating vehicle through artificial intelligence.

Description of Related Art

Today's vehicle is provided with various safety equipment to assist the safe traveling of a driver.

An accident of a traveling vehicle often occurs when changing a lane.

Therefore, when a driver changes a traveling lane, it is important to confirm the nearby vehicle approaching from the rear of the lane to change.

The driver utilizes the side mirrors to identify nearby vehicles approaching from the rear thereof.

However, the side mirrors have blind spots in which nearby vehicles may not be identified.

The blind spot indicates the area where the driver is not aware of it, even though the nearby vehicle is close to my vehicle.

When the driver does not find a vehicle in the blind spot and changes the lane to the same lane, it may lead to a collision accident.

Conventionally, a wide-angle side mirror has been provided to reduce the blind spot, but the blind spot has not been completely eliminated.

Meanwhile, a blind spot warning system has been recently introduced to identify a vehicle in a blind spot by attaching a motion detection sensor to the side surface of the vehicle.

However, the blind spot warning system is a method of displaying the side mirror in a separate manner, such that the driver checks the side mirror and determines whether to change the lane.

Meanwhile, in recent years, autonomous vehicle technology is evolving.

That is, there is also included a technique of displaying a blinking light on the side mirror of the vehicle and at the same time temporarily restricting steering to the same lane when the driver determines whether to change lane.

However, such a conventional technique limits only the steering in an autonomous vehicle and has a limitation that it may not assist a more active autonomous traveling.

Meanwhile, the driver does not know the traveling speed of the nearby vehicle approaching from the side and rear of the operating vehicle.

There was no way for the driver to know the approaching speed of the nearby vehicles through the side mirrors.

Therefore, even if the driver determines that the nearby vehicle approaching from the rear is far away through the side mirrors, it is a problem in the case that the speed of the corresponding nearby vehicle is relatively faster than the speed of the driver vehicle.

In the instant case, when the driver simply changes the lane because the nearby vehicle approaching from the rear is far away, there is the possibility of backward collision.

Furthermore, it is important to know whether the nearby vehicle approaching from the rear is a sedan or a heavy truck in terms of safe traveling.

Under the same conditions, it may be preferable that the driver is not in a hurry to change the lane to the same traveling lane as the nearby vehicle approaching from the rear is a large vehicle.

This is because, in the case of a large vehicle, the risk of rear collision is high due to an increase in the quick braking distance.

That is, the speed information related to the nearby vehicle approaching from the rear and the type information related to the vehicle are also important factors for safe traveling.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a traveling safety control system using ambient noise and a control method thereof.

Various aspects of the present invention provide a traveling safety control system using ambient noise including a microphone mounted in an operating vehicle and for receiving ambient noise; and a signal processing controller for comparing the ambient noise with vehicle noise characteristic data and determining traveling information related to a nearby vehicle through an artificial intelligence-based analysis.

Furthermore, at least a pair of the microphones is provided to be spaced from each other along the longitudinal direction on one side surface of the operating vehicle.

Furthermore, the signal processing controller is configured to determine a relative speed of the nearby vehicle and the operating vehicle through a sound pressure change analysis of the ambient noise, and identifies a type of the nearby vehicle and an engine type through a frequency change analysis of the ambient noise.

Furthermore, the traveling safety control system using ambient noise further includes a control module of controlling a traveling of the operating vehicle according to the traveling information related to the nearby vehicle.

Furthermore, the control module includes at least one of an accelerator pedal control unit, a brake braking control unit, and a wheel steering control unit.

Furthermore, the signal processing controller includes an LSTM learning algorithm.

Furthermore, the microphone is directional.

Furthermore, the microphone is mounted at the front, the rear, the right, and the left of the operating vehicle, respectively.

Furthermore, the traveling safety control system further includes a display unit of visualizing information related to the operating vehicle and the traveling information related to the nearby vehicle by receiving traveling condition data of the operating vehicle and road situation data during traveling.

Furthermore, the traveling condition data includes at least one among a CAN signal, a vehicle speed and a pedal opening amount, a gear position, and congestion information and speed limit information related to road during traveling.

Furthermore, the display unit displays to select any one of the autonomous traveling or the manual operation according to a predicted traveling state of the nearby vehicle.

Furthermore, the traveling safety control system using ambient noise further includes an image acquisition unit of providing the signal processing controller with image information related to the nearby vehicle by use of at least one among a Radar, a camera, and a GPS.

Furthermore, the present invention includes a safe traveling control method of using ambient noise including receiving ambient noise through a microphone mounted in an operating vehicle; and determining a type of a nearby vehicle by comparing the received ambient noise with vehicle noise characteristic data through artificial intelligence of a signal processing controller, and determining the traveling information related to the nearby vehicle through the artificial intelligence with the sound pressure change analysis and the frequency change analysis of the ambient noise.

Furthermore, the safe traveling control method further includes controlling at least one of a vehicle speed and a steering of the operating vehicle according to the traveling information related to the nearby vehicle through a control module.

Furthermore, the artificial intelligence includes an LSTM learning algorithm.

Furthermore, the determining the type of the nearby vehicle includes determining of whether the nearby vehicle is any one of the acceleration state, the deceleration state, and the constant-speed traveling state by determining a relative speed of the operating vehicle and the nearby vehicle through the sound pressure change analysis of the ambient noise.

Furthermore, the artificial intelligence is configured to identify the type of the nearby vehicle and an engine type through a frequency change analysis.

Furthermore, the safe traveling control method further includes displaying visualizing information related to the operating vehicle and the traveling information related to the nearby vehicle by receiving traveling condition data of the operating vehicle and road situation data during traveling through a display unit.

Furthermore, the traveling condition data includes at least one among a CAN signal, a vehicle speed and a pedal opening amount, a gear position, and congestion information and speed limit information related to road during traveling.

Furthermore, the safe traveling control method further includes acquiring an image adding the received image to the determining by receiving the image information related to the nearby vehicle using at least one among the Radar information, the camera information, and the Global Positioning System (GPS) information through an image acquisition unit.

According to an exemplary embodiment of the present invention as described above, the following effects may be obtained.

Firstly, it is possible to confirm the traveling information related to the nearby vehicle through the artificial intelligence by use of the ambient noise of the operating vehicle, changing the lane more safely.

Secondly, it is possible to learn the ambient noise by use of the artificial intelligence, maximizing the traveling safety through the prediction of the behavior of the bicycle driver or the pedestrian as well as the nearby vehicle.

Thirdly, it is possible to perform the active control such as acceleration, deceleration, braking, and steering of the operating vehicle through the analysis of the ambient noise using the artificial intelligence.

Fourthly, it is possible to display the surrounding situation in real time for the driver through the analysis of the ambient noise using the artificial intelligence so that the driver selects autonomous traveling or manual operation, facilitating more safe operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
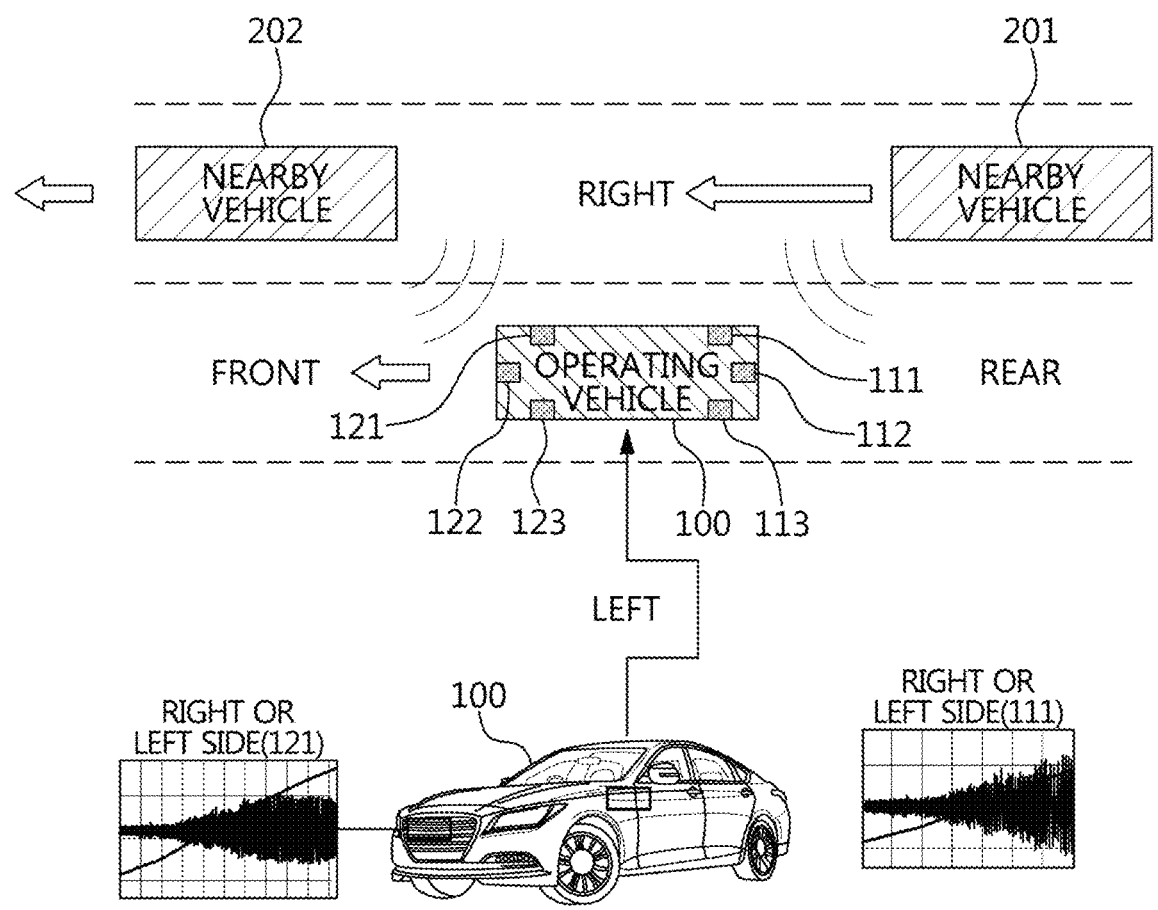
FIG. 1 is a diagram illustrating the traveling figure of the operating vehicle and the nearby vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various modifications and various embodiments may be made in accordance with various aspects of the present invention, so that specific embodiments are illustrated in the drawings and described in detail in the specification. It may be understood, however, that it is not intended to limit the present invention to the particular included forms, but includes all modifications, equivalents, and alternatives falling within the spirit and technical scope of the present invention.

Like reference numerals are used for like elements in describing each drawing.

The terms "first," "second," and the like may be used to illustrate different components, but the components may not be limited by the terms. The terms are used to differentiate one element from another.

For example, a first component may be referred to as a second component, and similarly, the second component may be also referred to as the first component without departing from the scope of the present invention. The terms "and/or" includes a combination of plurality of related listed items or any of a plurality of related listed items.

Unless otherwise defined, all terms including technical and scientific terms used herein have the same meaning as commonly understood by one of ordinary skill in the art to which an exemplary embodiment of the present invention belongs.

It will be further understood that terms, such as those defined in commonly used dictionaries, should be additionally interpreted as having a meaning which is consistent with their meaning in the context of the relevant art, and will not be interpreted in an idealized or overly formal sense unless expressly so defined in the application.

A traveling safety control system using ambient noise according to an exemplary embodiment of the present invention includes a microphone and a signal processing controller.

An operating vehicle described below refers to a vehicle provided with the traveling safety control system using the ambient noise of an exemplary embodiment of the present invention, and a nearby vehicle is a vehicle operated by other drivers and traveling in the vicinity of the operating vehicle such as front, rear, right, or left of the operating vehicle.

The microphone is mounted in the operating vehicle to receive ambient noise.

The ambient noise may include the engine noise generated from the nearby vehicle, the traveling road noise of the nearby vehicle, and the wind noise of the nearby vehicle.

Meanwhile, the ambient noise may be various noises generated by a motorcycle, a bicycle, or a pedestrian around the operating vehicle.

The signal processing controller 112 analyzes the ambient noise based on artificial intelligence to compare it with vehicle noise characteristics data and determine the traveling information related to the nearby vehicle.

That is, the signal processing controller 112 is provided with artificial intelligence, and the artificial intelligence may have the vehicle noise characteristic data.

Meanwhile, the artificial intelligence may database by learning the ambient noise input from the microphone.

The vehicle noise characteristic data may include various information according to the size of the vehicle, the engine type, and the engine kind.

For example, they include whether the vehicle is a sedan or a truck, a large vehicle or a small vehicle, and the like.

Meanwhile, the vehicle noise characteristic data according to whether the engine type of the vehicle is diesel or gasoline, how much the engine displacement is, and whether the number of cylinders of the engine is 4 cylinders, 6 cylinders, 8 cylinders or 12 cylinders are included therein.

The signal processing controller 112 may determine a relative speed of the nearby vehicle and the operating vehicle through a sound pressure change analysis of the ambient noise, and may identify the type of the nearby vehicle and the engine type thereof through the frequency change analysis of the ambient noise.

At least one pair of microphones may be provided to be spaced from each other along the longitudinal direction on one side surface of the operating vehicle.

The microphone may be mounted in the front, the rear, the right, and the left of an operating vehicle 100, respectively.

The microphone may preferably be directional.

The direction of the arrow in FIG. 1 is the front of the vehicle.

Referring to FIG. 1, the microphone is provided so that a pair of the first microphone 111 and the second microphone 121 is spaced from each other along the longitudinal direction on the right side surface and/or the left side surface of the operating vehicle 100.

The operating vehicle 100 and a nearby vehicle 201 at the first timing are straightly traveling in a direction parallel to each other, and the expression of the approach below means that the operating vehicle 100 and the nearby vehicle 201 at the first timing are getting close to each other rather than being in contact with each other.

The second microphone 121 is provided at the front right side and/or the front left side of the operating vehicle 100, and the first microphone 111 is provided at the rear right side and/or the rear left side of the operating vehicle 100.

The operating vehicle 100 is straightly traveling in a state where the traveling speed is constant.

The nearby vehicle 201 at the first timing is before overtaking the operating vehicle 100 and a nearby vehicle 202 at the second timing is accelerating by overtaking the operating vehicle 100.

The nearby vehicle 201 at the first timing and the nearby vehicle 202 at the second timing are the same nearby vehicle.

The nearby vehicle 201 at the first time is approaching the operating vehicle 100 from the rear of the operating vehicle 100 in the right lane of the lane in which the operating vehicle 100 is traveling.

That is, when the speed of the nearby vehicle 201 at the first timing is faster than the speed of the operating vehicle 100, the nearby vehicle 201 at the first timing will overtake the operating vehicle 100 after a predetermined time.

The first microphone 111 collects the ambient noise generated from the nearby vehicle 201 at the first timing.

It is assumed that the nearby vehicle 202 at the second timing is accelerating by overtaking the operating vehicle 100 at the second timing after the first timing.

The second microphone 121 collects the ambient noise generated from the nearby vehicle 202 at the second timing.

A control module 122 receives the traveling information related to the nearby vehicle and controls an accelerator pedal or a brake pedal or a steering wheel for the traveling of the operating vehicle. A display unit 123 visualizes the information related to the circumstance situation by receiving data and displays to select any one of the autonomous traveling or the manual operation. An image acquisition unit 113 generates image information by receiving data and provides the image information to the signal processing controller 112.

It will be described with reference to the result of analyzing the ambient noise thus collected.

Figure 2A:
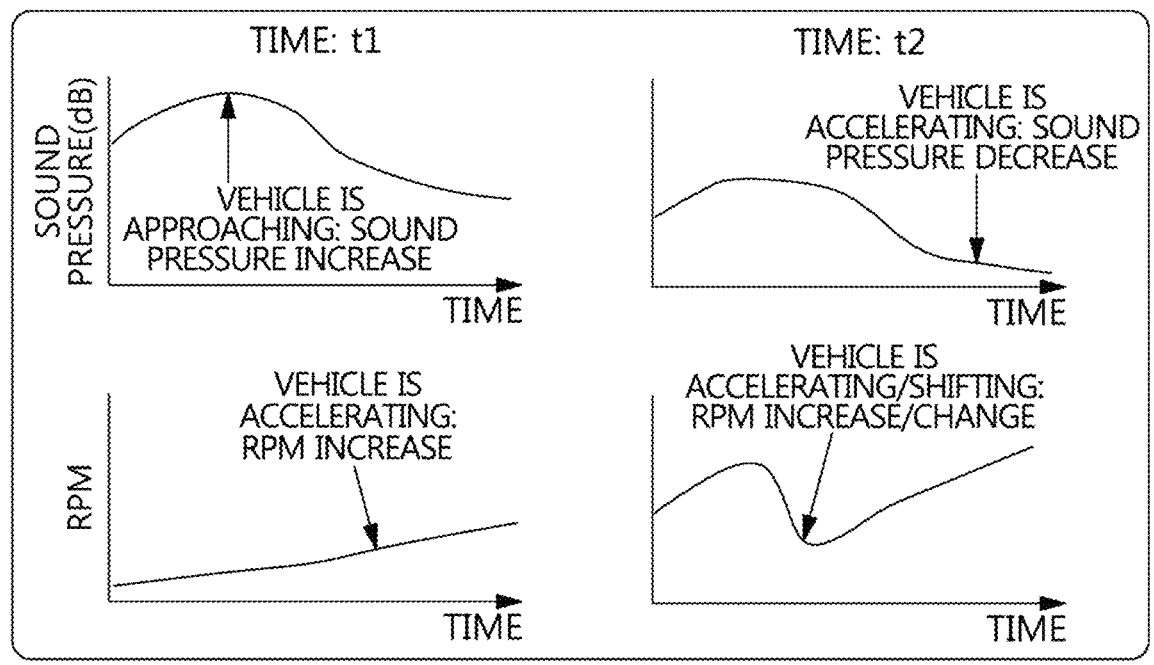
FIG. 2A and FIG. 2B are a diagram illustrating a sound pressure change analysis graph A of the ambient noise generated by a nearby vehicle 201 at a first timing and a sound pressure change analysis graph B of the ambient noise generated by a nearby vehicle 202 at a second timing according to an exemplary embodiment of the present invention.
Figure 2B:
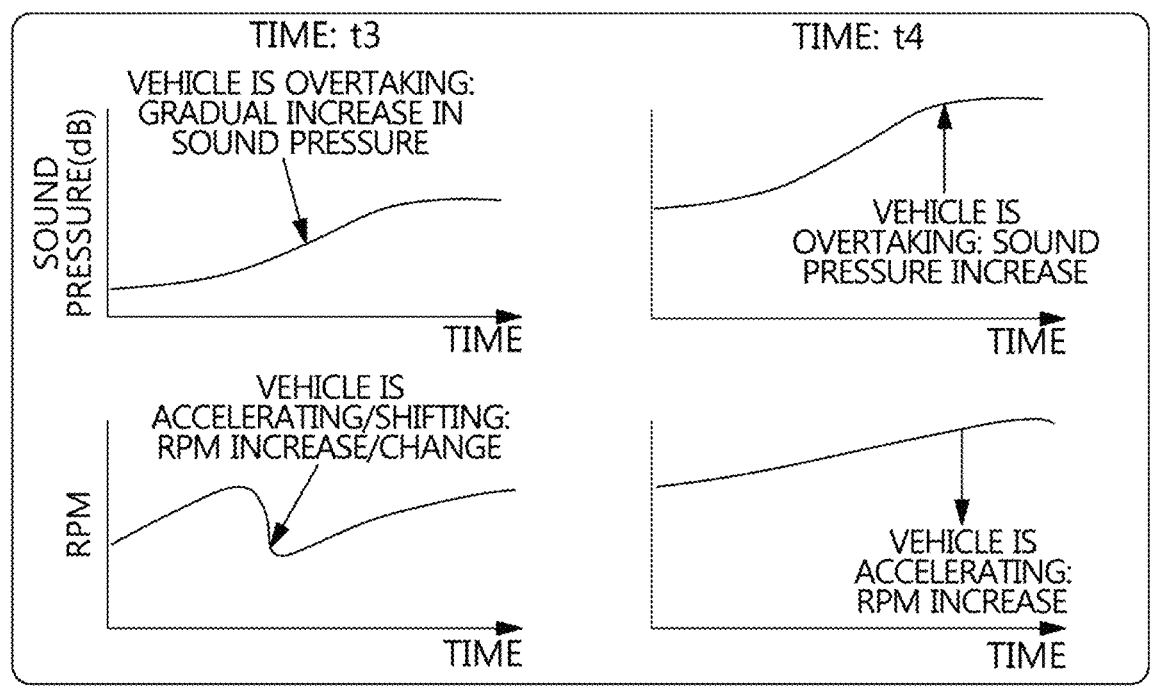

FIGS. 2 and 2B are a diagram illustrating a sound pressure change analysis graph A of the ambient noise generated by a nearby vehicle 201 at a first timing and a sound pressure change analysis graph B of the ambient noise generated by a nearby vehicle 202 at a second timing according to an exemplary embodiment of the present invention.

The first microphone 111 receives the ambient noise at the timing T1 and the timing T2, and the second microphone 121 receives the ambient noise at the timing T3 and the timing T4.

That is, the timing T1 and the timing T2 are the timings when the nearby vehicle 201 at the first timing is approaching the operating vehicle 100 from the rear of the operating vehicle 100, and the timing T3 and the timing T4 are the timings when the nearby vehicle 201 at the first timing accelerates after overtaking the operating vehicle 100.

At the timing T1, when the nearby vehicle 201 at the first timing approaches the rear of the operating vehicle 100, the sound pressure input to the first microphone 111 is increased, and the nearby vehicle 201 at the first timing is accelerating, such that the engine RPM to be measured is increased.

At the timing T2, the engine RPM is instantaneously decreased and then increased again as the nearby vehicle 201 at the first timing is shifted for overtaking, and the sound pressure input to the first microphone 111 is reduced.

At the timing T3, when the nearby vehicle 202 at the second timing deploys an accelerator, the engine RPM is instantaneously decreased and then increased again as the gear is shifted, and the sound pressure received into the second microphone 121 is gradually increased.

At the timing T4, when the nearby vehicle 202 at the second timing continues to deploy the accelerator, the engine RPM of the nearby vehicle 202 at the second timing linearly increases and the sound pressure received into the second microphone 121 is increased.

A graph of the engine RPM may change according to a change in the opening amount of the acceleration pedal of the nearby vehicle.

Figure 3A:
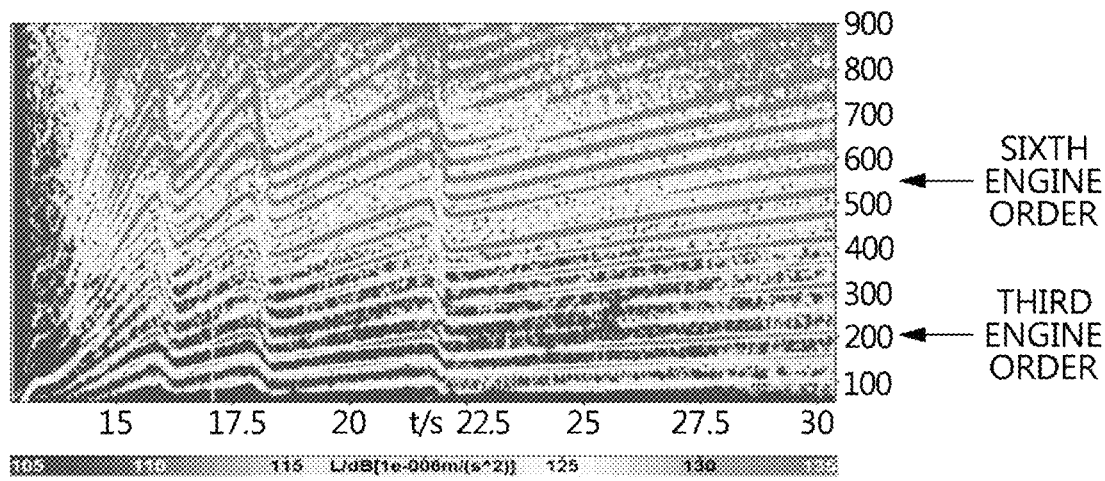
FIG. 3A, FIG. 3B and FIG. 3C are a diagram illustrating a frequency analysis graph A of the third engine order and the sixth engine order of the six-cylinder engine, a frequency change analysis graph B of the ambient noise generated by the nearby vehicle 201 at the first timing, and a frequency change analysis graph C of the ambient noise generated by the nearby vehicle 202 at the second timing according to an exemplary embodiment of the present invention.
Figure 3B:
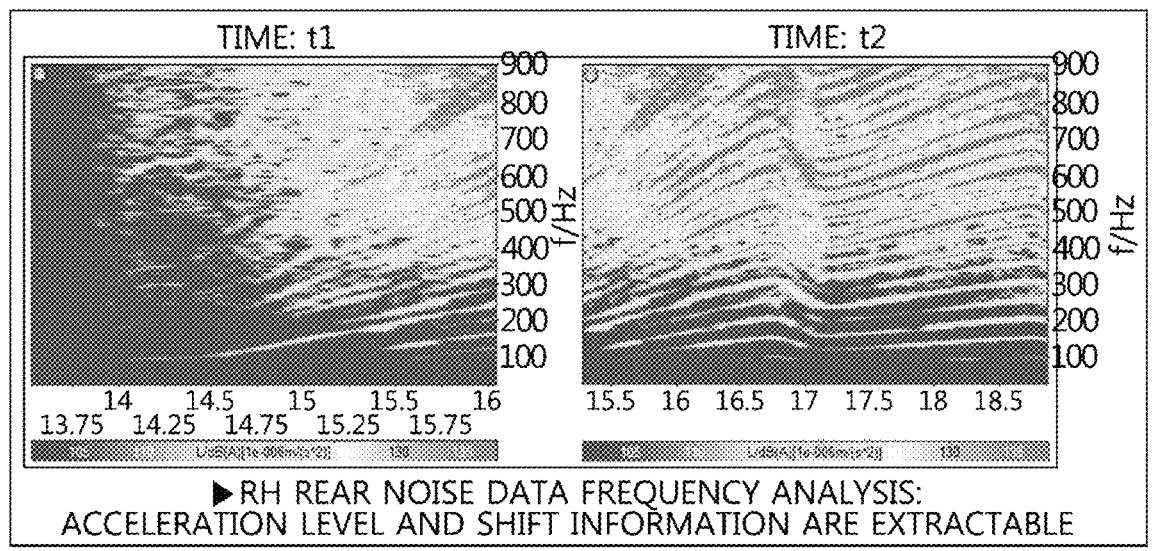
Figure 3C:
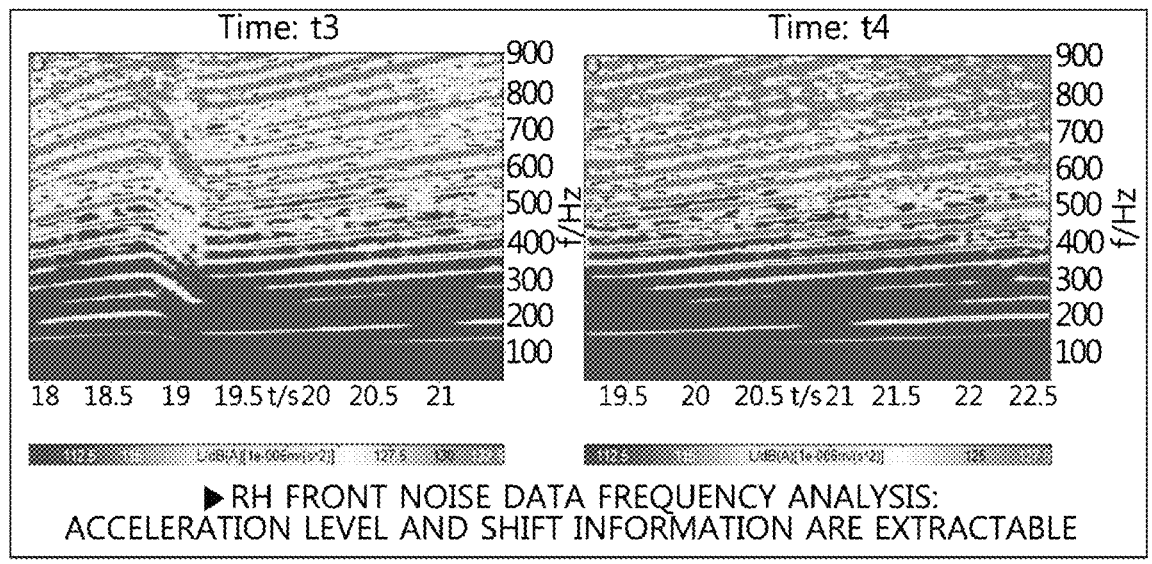

FIG. 3A, FIG. 3B and FIG. 3C are a diagram illustrating a frequency analysis graph A of the third engine order and the sixth engine order of the six-cylinder engine, a frequency change analysis graph B of the ambient noise generated by the nearby vehicle 201 at the first timing, and a frequency change analysis graph C of the ambient noise generated by the nearby vehicle 202 at the second timing according to an exemplary embodiment of the present invention.

The engine order means a proportional constant of the RPM and the frequency of a crankshaft.

That is, the engine order is an index indicating how many times the crankshaft rotates per second.

For example, the third engine order indicates an engine noise due to the order when the crankshaft rotates three times, and the sixth engine order indicates an engine noise due to the order when the crankshaft rotates six times.

In FIG. 3A, the third engine order and the sixth engine order components of the six-cylinder engine are displayed.

The signal processing controller 112 performs the frequency analysis of the right rear noise data of the operating vehicle 100 through the ambient noise collected by the first microphone 111 at the timing T1 and the timing T2.

Therefore, the acceleration level and the shift information related to the nearby vehicle 201 at the first timing may be extracted.

The signal processing controller 112 performs frequency analysis of the right front noise data of the operating vehicle 100 through the ambient noise collected by the second microphone 121 at the timing T3 and the timing T4.

Therefore, the acceleration level and the shift information related to the nearby vehicle 202 at the second timing may be extracted.

The traveling information related to the nearby vehicle thus extracted is provided to a control module 122 for supporting the safe operation of the operating vehicle.

That is, the control module 122 controls the traveling of the operating vehicle according to the traveling information related to the nearby vehicle.

The control module 122 may include at least one among an accelerator pedal control unit, a brake braking control unit, and a wheel steering control unit.

The signal processing controller 112 may include an LSTM (Long Short Term Memory) learning algorithm.

A display unit 123 may visualize the information related to the operating vehicle and the traveling information related to the nearby vehicle by receiving traveling condition data of the operating vehicle and road situation data during traveling.

The display unit 123 may also display to select any one of the autonomous traveling or the manual operation according to a predicted traveling state of the nearby vehicle.

The driver may select whether to maintain the autonomous traveling or switch to the manual operation while watching the traveling state of the nearby vehicle displayed on the display unit 123.

The traveling condition data may include at least one of the CAN signal, vehicle speed and pedal opening amount, gear position, and the congestion information and speed limit information related to a road during traveling.

Another exemplary embodiment of the present invention may further include an image acquisition unit 113.

The image acquisition unit 113 provides the signal processing controller 112 with the image information related to the nearby vehicle by use of at least one among a Radar, a camera, and a GPS.

Therefore, the signal processing controller 112 may provide by analyzing and predicting the traveling situation of the nearby vehicle more accurately by use of the image information related to the nearby vehicle as well as the ambient noise information related to the nearby vehicle.

Next, a safe traveling control method of using ambient noise according to an exemplary embodiment of the present invention will be described.

Figure 4:
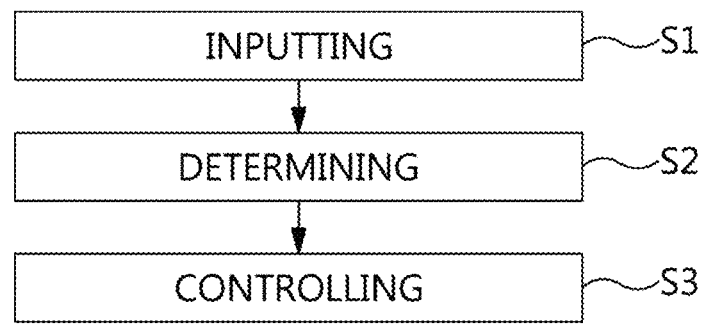
FIG. 4 is a control flowchart according to an exemplary embodiment of the present invention.
Figure 5:
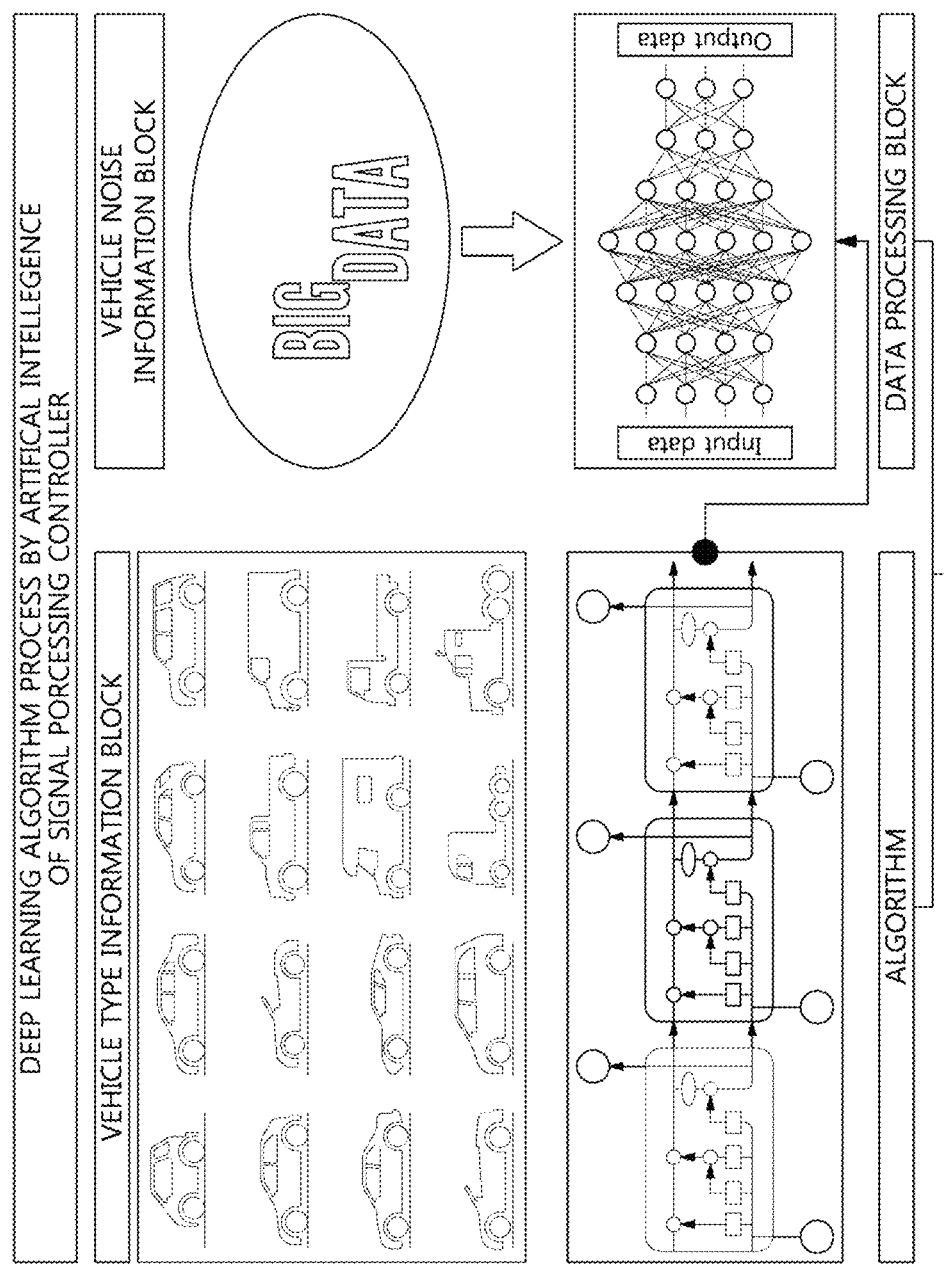
FIG. 5 is a diagram illustrating the learning process based on vehicle noise big data implemented by an artificial intelligence of a signal processing controller according to various exemplary embodiments of the present invention.
Figure 6:
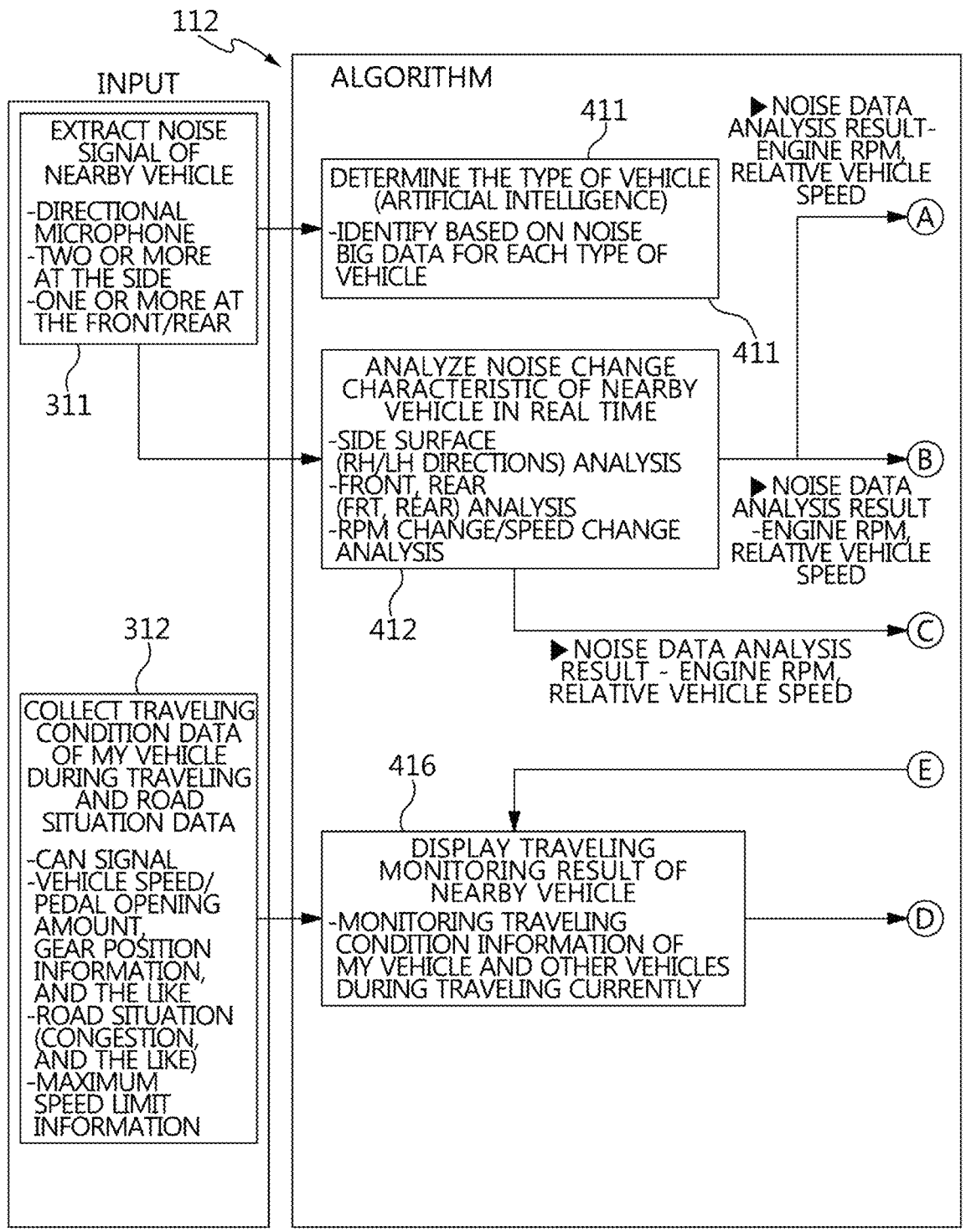
FIG. 6 and FIG. 7 are flowcharts of a control algorithm according to an exemplary embodiment of the present invention.
Figure 7:
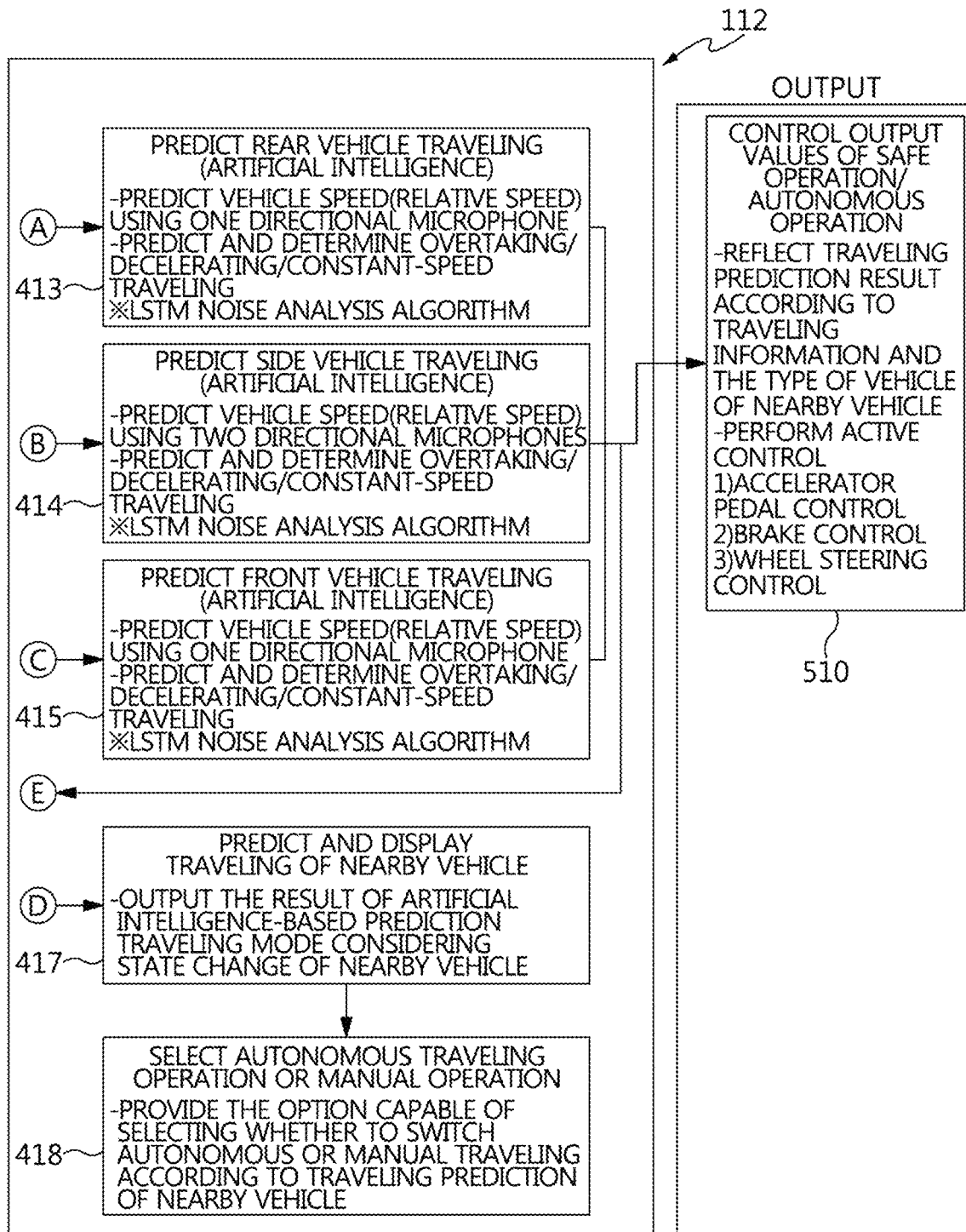

FIG. 4 is a control flowchart according to an exemplary embodiment of the present invention, FIG. 5 is a diagram illustrating an artificial intelligence learning process according to exemplary embodiment of the present invention, and FIG. 6 and FIG. 7 are flowcharts of a control algorithm according to an exemplary embodiment of the present invention.

Referring to FIG. 5, the artificial intelligence of the signal processing controller 112 performs the procedures of a vehicle type information block and a vehicle noise information block and then derives the result of an artificial intelligence learning based on vehicle noise big data by the procedures of a data processing block of a deep learning algorithm and an algorithm block of the deep learning algorithm.

For example, the vehicle type information block processes a distinguishing step of a sedan, a truck, a large vehicle, a small vehicle, diesel engine and gasoline engine. The vehicle noise information block processes a matching step of the vehicle noise data so that noise classification is divided into a difference among a vehicle type, an engine displacement, the number of cylinders of an engine. The data processing block processes an input data recognition step of an ambient noise data collected while driving, and an output step of a vehicle type/an engine type determined by the input data processing based on the big data. The algorithm block processes an analysis of a vehicle noise data that changes with time using a learning algorithm of Long Short Term Memory (LSTM), and data construction step for a vehicle type, engine speed vehicle speed, and sudden run from the learning result of the ambient noise.

Referring to FIG. 6 and FIG. 7, the signal processing controller 112 includes an input device, an algorithm device and an output device.

The input device includes a noise signal extractor 311 extracting an ambient noise signal through a microphone mounted in the operating vehicle, an operating vehicle data detector 312 detecting the traveling condition information during traveling and an image acquirer 321 receiving the image information related to the nearby vehicle to add the received image to the determination.

The algorithm device includes a nearby vehicle discriminator 411 determining the type of the nearby vehicle, a vehicle traveling discriminator 412 determining the traveling information related to the nearby vehicle, a rear vehicle predictor 413 predicting the rear vehicle traveling, a side vehicle predictor 414 predicting the left and right vehicle traveling, a front vehicle predictor 415 predicting the front vehicle traveling, a display 416 displaying the operating vehicle, a traveling information predictor 417 receiving traveling condition data of the operating vehicle and road situation data during traveling, an option selector 418 selecting an autonomous traveling operation or the manual operation option mode, a vehicle discriminator 421 determining the type of the vehicle from the acquiring the image, a real time analyzer 422 analyzing the speed and the information related to the nearby vehicle in real time, a condition predictor 423 predicting the traveling condition and a situation recognizer 424 recognizing the change in the relative speed with the nearby vehicle.

The output device includes a control selector 510 selecting at least one of the vehicle speed and the steering of the operating vehicle.

Inputting S1 extracts an ambient noise signal through a microphone mounted in the operating vehicle by use of the noise signal extractor 311.

Determining S2 determines the type of the nearby vehicle by comparing the ambient noise inputted through artificial intelligence with the vehicle noise characteristic data by use of the nearby vehicle discriminator 411, and determines the traveling information related to the nearby vehicle through the sound pressure change analysis and the frequency change analysis of the ambient noise by use of the vehicle traveling discriminator 412. At the present step, the vehicle type information block and the vehicle noise information block are involved.

The microphone may be mounted at the front, the rear, the right, and the left of the operating vehicle, respectively.

The artificial intelligence may perform the rear vehicle traveling prediction of the rear vehicle predictor 413, the left and right vehicle traveling prediction of the side vehicle predictor 414, and the front vehicle traveling prediction of using the front vehicle predictor 415 by use of the ambient noise inputted from each microphone.

The artificial intelligence may include the LSTM learning algorithm, and indentify the type of the nearby vehicle and the engine type through the frequency change analysis.

The determining S2 determines whether the nearby vehicle is any one of the acceleration state, the deceleration state, or the constant-speed traveling state by determining a relative speed of the operating vehicle and the nearby vehicle through the sound pressure change analysis of the ambient noise. At the present step, the data processing block and the algorithm block are involved.

Controlling S3 controls at least one of a vehicle speed and a steering of the operating vehicle according to the traveling information related to the nearby vehicle by use of the control selector 510 extracted in the determining S2.

Displaying by use of the display 416 may predict and visualize the information related to the operating vehicle and the traveling information related to the nearby vehicle of the traveling information predictor 417 by receiving traveling condition data of the operating vehicle and road situation data during traveling by use of the operating vehicle data detector 312.

At the present time, the driver may select an autonomous traveling operation or the manual operation option mode of the option selector 418 displayed and provided therefor.

Meanwhile, the traveling condition data of the operating vehicle data detector 312 may include at least one of the CAN (Controller Area Network) signal, vehicle speed and pedal opening amount, gear position, and the congestion information and speed limit information related to a road during traveling.

Figure 8:
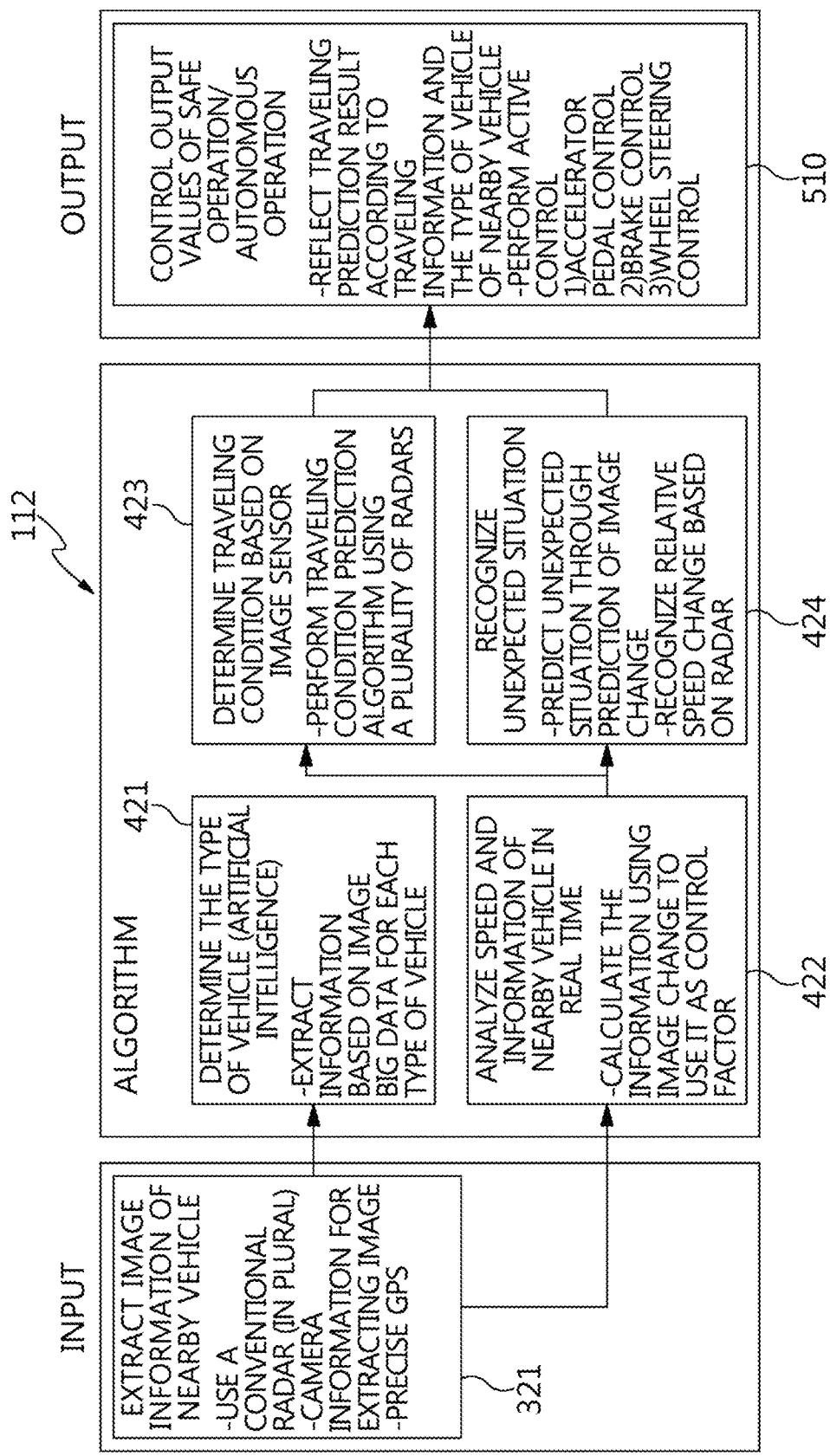
FIG. 8 is a flowchart of a control algorithm according to various exemplary embodiments of the present invention.

FIG. 8 is a flowchart of a control algorithm according to various exemplary embodiments of the present invention.

Acquiring an image of the image acquirer 321 may receive the image information related to the nearby vehicle using at least one of the Radar information, the camera information, and the Global Positioning System (GPS) information to add the received image to the determining S2.

The artificial intelligence may determine the type of the vehicle from the acquiring the image of the image acquirer 321 and the vehicle discriminator 421, and analyze the speed and the information related to the nearby vehicle in real time by use of the real time analyzer 422.

Based on the result, it is possible to predict the traveling condition by use of the condition predictor 423, to recognize unexpected situation by recognizing the change in the relative speed with the nearby vehicle of the situation recognizer 424, and to control at least one of a vehicle speed and a steering of the operating vehicle according to the traveling information related to the nearby vehicle by use of the control selector 510.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A traveling safety control system using ambient noise, the traveling safety control system comprising:
    a microphone mounted in an operating vehicle and of receiving the ambient noise; and
    a signal processing controller configured for comparing the ambient noise with vehicle noise characteristic data and determining traveling information related to a nearby vehicle through an artificial intelligence-based analysis,
    wherein the signal processing controller calculates a relative speed of the nearby vehicle and the operating vehicle through a sound pressure change analysis of the ambient noise, and identifies a type of the nearby vehicle and an engine type through a frequency change analysis of the ambient noise.

2. The traveling safety control system using the ambient noise of claim 1,
    wherein at least a pair of microphones including the microphone mounted in the operating vehicle is configured to be spaced from each other along a longitudinal direction on a side surface of the operating vehicle.

3. The traveling safety control system using the ambient noise of claim 1, further including a control module of controlling a traveling of the operating vehicle according to the traveling information related to the nearby vehicle.

4. The traveling safety control system using the ambient noise of claim 3,
    wherein the control module includes at least one of an accelerator pedal controller, a brake braking controller, and a wheel steering controller.

5. The traveling safety control system using the ambient noise of claim 1,
    wherein the signal processing controller includes a Long Short Term Memory (LSTM) learning algorithm.

6. The traveling safety control system using the ambient noise of claim 1,
    wherein the microphone is directional.

7. The traveling safety control system using the ambient noise of claim 2,
    wherein the at least a pair of the microphones is mounted at a front, a rear, a right, and a left of the operating vehicle, respectively.

8. The traveling safety control system using the ambient noise of claim 1, further including:
    a display unit of visualizing information related to the operating vehicle and the traveling information related to the nearby vehicle by receiving traveling condition data of the operating vehicle and road situation data during traveling.

9. The traveling safety control system using the ambient noise of claim 8,
    wherein the traveling condition data includes at least one among a Controller Area Network (CAN) signal, a vehicle speed and a pedal opening amount, a gear position, and congestion information and speed limit information related to a road during traveling.

10. The traveling safety control system using the ambient noise of claim 9,
    wherein the display unit displays to select one of an autonomous traveling or a manual operation according to a predicted traveling state of the nearby vehicle.

11. The traveling safety control system using the ambient noise of claim 1, further including an image acquisition unit of providing the signal processing controller with image information related to the nearby vehicle by use of a Radar or a camera.

12. A safe traveling control method of using ambient noise, the safe traveling control method including:
    receiving the ambient noise through a microphone mounted in an operating vehicle; and
    determining a type of a nearby vehicle by comparing the received ambient noise with vehicle noise characteristic data through artificial intelligence, and determining traveling information related to the nearby vehicle through a sound pressure change analysis and a frequency change analysis of the ambient noise,
    wherein the determining includes determining of whether the nearby vehicle is any one of acceleration state, deceleration state, and constant-speed traveling state by calculating a relative speed of the operating vehicle and the nearby vehicle through the sound pressure change analysis of the ambient noise, and identifying the type of the nearby vehicle and an engine type through the frequency change analysis of the ambient noise.

13. The safe traveling control method of using the ambient noise of claim 12, further including:
    controlling at least one of a vehicle speed and a steering of the operating vehicle according to the traveling information related to the nearby vehicle.

14. The safe traveling control method of using the ambient noise of claim 12,
    wherein the artificial intelligence includes a Long Short Term Memory (LSTM) learning algorithm.

15. The safe traveling control method of using the ambient noise of claim 12,
    wherein the artificial intelligence is configured to identify the type of the nearby vehicle and an engine type through the frequency change analysis.

16. The safe traveling control method of using the ambient noise of claim 12, further including:
    displaying visualizing information related to the operating vehicle and the traveling information related to the nearby vehicle by receiving traveling condition data of the operating vehicle and road situation data during traveling.

17. The safe traveling control method of using the ambient noise of claim 16,
    wherein the traveling condition data includes at least one among Controller Area Network (CAN) signal, vehicle speed and pedal opening amount, gear position, and congestion information and speed limit information related to a road during traveling.

18. The safe traveling control method of using the ambient noise of claim 12, further including:
acquiring an image to add the acquired image to the determining by receiving image information related to the nearby vehicle using at least one among Radar information and camera information.

* * * * *